INVENTORS.
MARCO PADALINO
WILLIAM F. KRAJEWSKI
HIROSHI NAGAKURA
BY Nathan N. Kallman
Attorney United States Patent Office 3,500,385
Patented Mar. 10, 1970

3,500,385
CODED DATA STORAGE AND RETRIEVAL SYSTEM

Marco Padalino, San Jose, William F. Krajewski, Los Gatos, and Hiroshi Nagakura, San Jose, Calif., assignors to International Business Machines Corporation, Armonk, N.Y., a corporation of New York Filed July 17, 1967, Ser. No. 653,784
Int. Cl. G06f *5/00;* G11b *5/06*
U.S. Cl. 340—347 9 Claims

ABSTRACT OF THE DISCLOSURE

A data processing system employs a modified frequency modulation, incorporating a particular code useful for recording and detecting binary data on a storage medium, or for transmission and detection of data in a communication system.

BACKGROUND OF THE INVENTION

Field of the invention

The invention relates to data processing, and in particular, to a novel and improved pulse coding technique.

Description of the prior art

With the large amount of data that is processed in modern day technology, it is highly desirable to provide high packing densities with a minimum of error or loss of the information being stored and recovered. However, operation with high packing densities generally results in pulse crowding, peak shifting and amplitude variations, which are deleterious to the detection of stored data signals. Several modulation and coding techniques have been proposed to improve storage capabilities and to minimize the problems attendant with high packing densities. One of these techniques is known as modified frequency modulation (MFM), which is particularly applicable to digital data storage and retrieval systems.

In an MFM system, a transition that is manifested by a flux reversal on the magnetic medium occurs at the midpoint of a bit cell period for a first binary value, which may be a binary "1," for example; and at the leading edge of the bit cell period for a second binary value, a binary "0," except when the "0" immediately follows a "1." The presence of a data pulse B may be arbitrarily designated as a value "1," and the absence of a data pulse $\overline{B}$ may be designated as a "0" value. The "0" transitions may be used for timing or as a clock pulse. When compared to NRZI, FM, PM, or other known methods at equal capacity, MFM affords several advantages, such as an increased signal and an improved signal-to-noise ratio, and less sensitivity to head-medium spacing variations, and less peak shift, among other things.

In a binary data magnetic recording and reproducing system, tape stretch, variations in head-to-medium spacing or alignment, pulse crowding and the like, result in a peak shift or phase shift of the bit cells. In the event such conditions occur, the data pulses will move closer together, giving rise to a bit shift condition. Bit shift causes distortion, poor signal-to-noise ratio, and a possible loss of information, among other things. Apparently, one way to avoid such degrading effects is by reducing storage density, which is not desirable. Another approach is to utilize MFM and to improve the coding and decoding techniques, whereby the feature of high packing density is realized with a substantial minimization of the abovementioned problems.

An object of this invention is to provide a novel and improved encoding and decoding technique useful with modified frequency modulation that affords a substantial increase in storage density.

Although the description of the invention is directed herein to a magnetic recording and reproducing apparatus, it should be understood that the inventive concept is readily applicable to other systems, such as data communication, optical storage apparatus and the like.

SUMMARY OF THE INVENTION

According to this invention, an apparatus for processing data that are encoded by MFM comprises an oscillator which generates a pulse train at twice the frequency ($2f$) of the binary data being received for storage. The $2f$ pulse signal is counted down in a trigger circuit to produce two clock signals, each having a frequency $f$, and appearing alternately at half-period intervals. The binary data bits, B and $\overline{B}$ representing the presence and absence of data respectively, are strobed from a register into separate channels with the two alternate half-period clock signals, and a gating signal is developed from the half-period bits B and $\overline{B}$. Only those pulses that correspond to the B and multiple $\overline{B}$ bits of the data strobed from the register are gated through, and combined to produce the MFM waveform that is recorded.

For detection and playback, the decoding circuit of this invention comprises a variable frequency oscillator that includes a ramp generator, which produces a ramp signal at twice the frequency ($2f$) of the data frequency. Means are coupled to the ramp generator to develop gating signals, such that the intervals for detection of the recorded B data bits, characterized by midcell transitions, are greater than those allotted to the $\overline{B}$ data bits with edge or boundary transitions. Thus, the bit shift problem, found in coding apparatus utilizing midcell flux reversals interlaced with edge transitions, is alleviated, since the bit cell portion or window used for detection of the midcell transition is effectively increased, thus allowing a further increase in packing density.

BRIEF DESCRIPTION OF THE DRAWING

The foregoing and other objects, features and advantages of the invention will be apparent from the following more particular description of a preferred embodiment of the invention, as illustrated in the accompanying drawings in which.

DESCRIPTION OF THE PREFERRED EMBODIMENT

Figure 1:
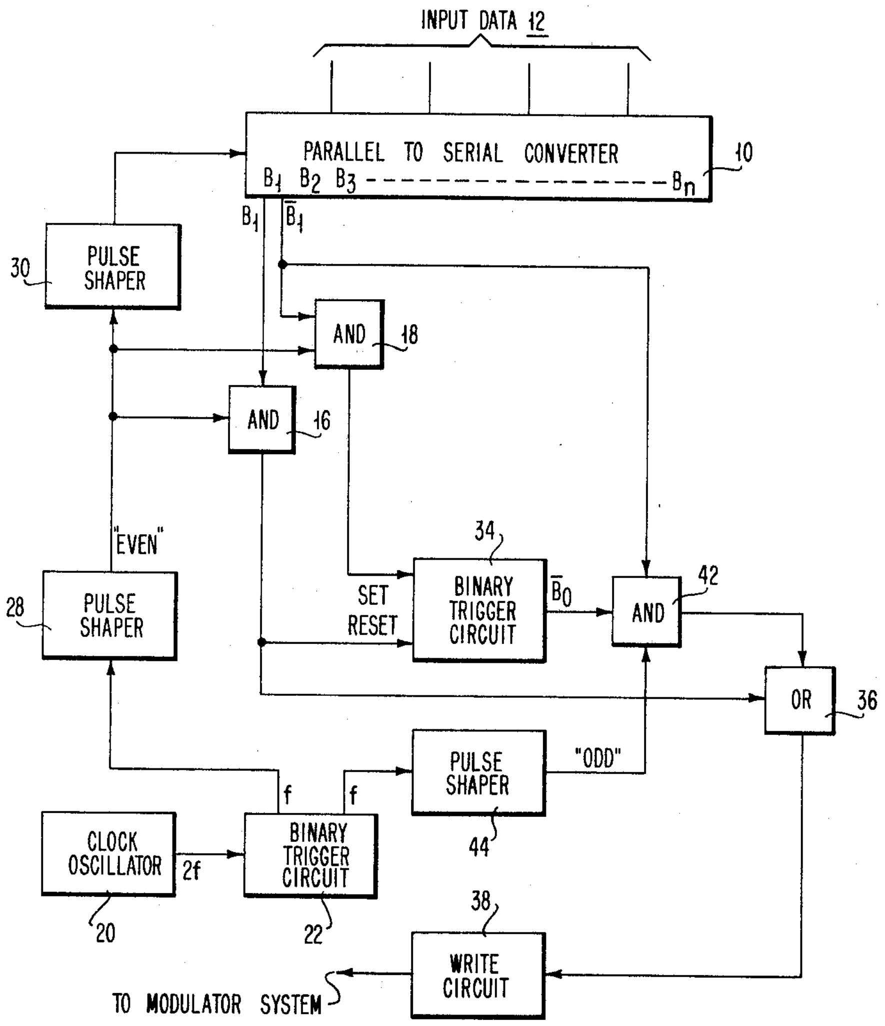
FIGURE 1 is a block diagram of the encoding apparatus, utilized with the present invention.
Figure 2:
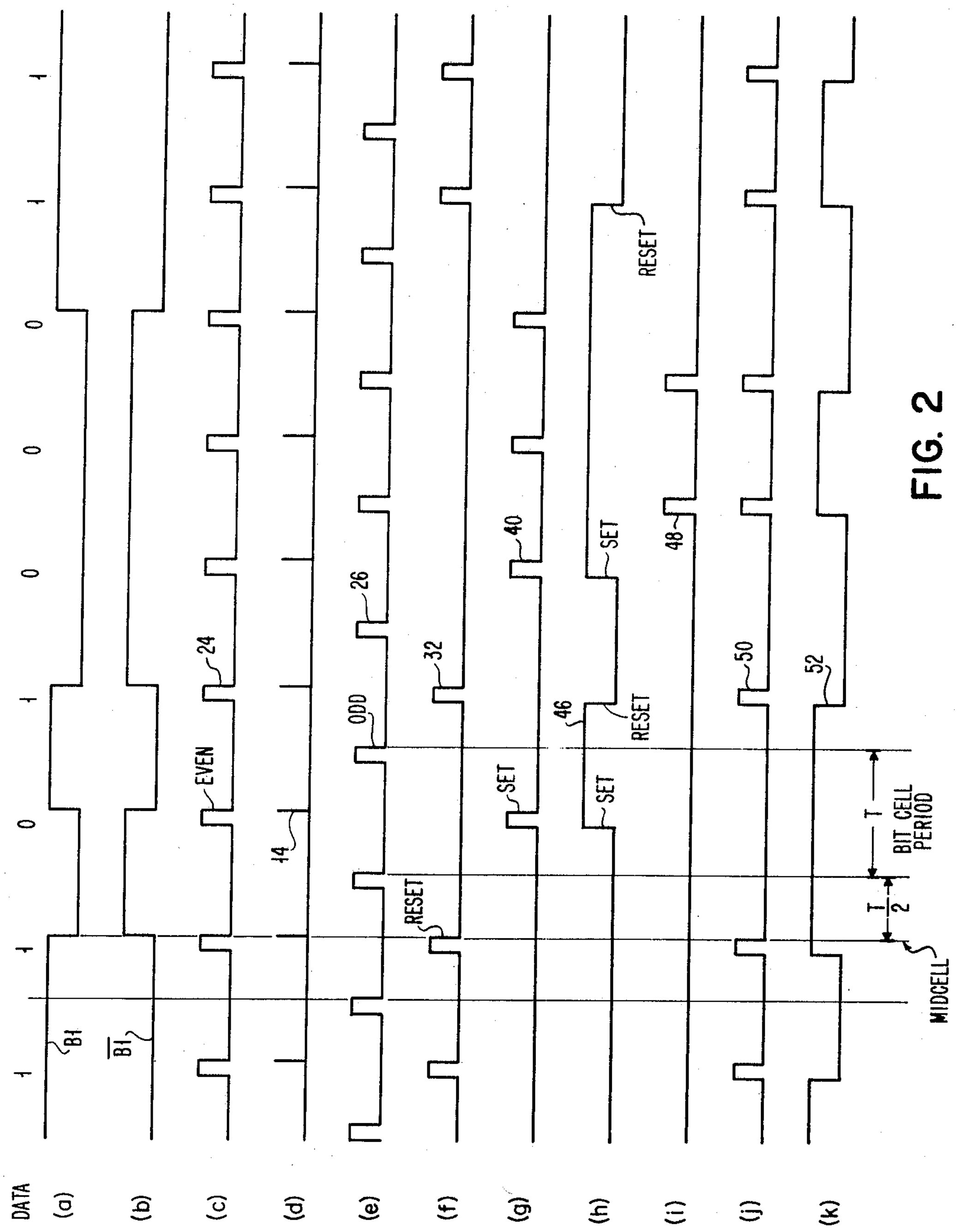
FIGURES 2*a–k* are a series of waveforms to aid in the explanation of the operation of the apparatus of FIG. 1.

With references to FIGURES 1 and 2, an encoding circuit includes a register or parallel to serial converter 10 that receives binary bit data in parallel from a data source, such as a central processing unit (not shown) through a multiplicity of lines 12 (represented by four lines, by way of example). The register 10 converts the parallel bits to a pulse train, and in response to a strobe pulse 14 (FIG. 2*d*), provides a serial output at a frequency $f$ to a first channel including an AND gate 16 and to a second channel including an AND gate 18. In the event that the register bit is a binary "1" (B1), the logic circuit associated with the output of register 10 causes AND gate 16 to set, while a binary "0" ($\overline{B1}$) sets the AND gate 18 (see FIGS. 2*a, b*).

To obtain the strobe pulse 14, timing pulses are generated by a reference clock oscillator 20 at a frequency 2*f*, i.e., twice the frequency of the data pulse output of the register 10. The 2*f* clock pulse is counted down by a binary trigger circuit 22 to produce a first timing pulse 24 (FIG. 2*c*), designated as the even clock pulse, and a second timing pulse 26 (FIG. 2*e*) called the odd clock pulse. Each clock pulse 24 and 26 has a frequency *f*, i.e., half of the reference clock, and the time interval between the even and odd clock pulses is *T*/2, where each is generated at intervals T.

The even clock pulse 24 is channeled through a pulse shaper 28 to a second pulse shaper 30 that provides a sharp strobe signal 14 in response to the trailing edge of the clock pulse 24. This strobe signal 14 is applied at the frequency *f* to the register 10, whereby the stored bits $B_1$, $B_2$ - - - $B_n$ are serially provided to the signal channels including AND gates 16 and 18.

In the event that the bit from the register 10 is a binary "1," the AND gate 16 is set or conditioned so that upon receipt of a pulse 24 from the shaper 28, an output signal 32 (FIG. 2*f*) is developed. The pulse 32 is fed to a bistable multivibrator (or binary trigger) circuit 34, that is Reset at midcell time if previously in the Set state, or remains Reset. In effect, the trigger 34 assumes the Reset condition whenever a "1" bit is seen at register 10. The binary trigger 34 serves to retain the memory of the preceding bit, being set for "0" and reset for "1."

Simultaneously, the positive pulse output 32 from AND gate 16 is directed to a conventional logic OR gate 36, which passes a pulse in response to any "true" input signal, which is a positive pulse in this case. The gated pulse then is applied to a write circuit 38, such as associated with a magnetic transducer of a recording system, for direct recording onto a magnetic medium, as is well known in the art.

On the other hand, if the bit obtained from the register 10 is "0" or $\overline{B1}$, then AND gate 18 produces an output signal 40 (FIG. 2*g*) upon coincidence of an even clock pulse 24 from the shaper 28 and the $\overline{B1}$ data signal. The gate signal 40 sets the trigger 34 at midcell time, which occurs for every "multiple zero," that is, every "0" bit except that which immediately follows a "1" bit.

The $\overline{B1}$ pulse from the register 10 is applied to a three-input AND gate 42, which also receives the odd clock pulse 26 from a pulse shaper 44. If the binary trigger 34 is in a Reset state, indicating that the last bit received was a binary "1," then there is no output from the trigger circuit 34 when a first "0" bit is received. However, after application of the first "0" after a "1," the trigger 34 is set. If a "0" is applied to the trigger 34 when in Set condition, then the trigger 34 will provide an output voltage that will enable AND gate 42. Upon coincident application of the $\overline{B1}$ pulse (FIG. 2*b*) from the register 10, the odd clock pulse 26 from the shaper 44, and the trigger voltage 46 (FIG. 2*h*), the gate 42 passes a pulse signal 48 (FIG. 2*i*), representing multiple "0's," through the OR gate 36 for further utilization by the write circuit 38.

It should be noted that pulse 48 is developed only for multiple "0's," whereas pulse 32 is produced for each "1" bit. As a result, an encoded pulse signal 50 (FIG. 2*j*), representing the interlaced binary "1's" and multiple "0's," is derived. Each pulse 50 that is applied to the write circuit 38 effects a flux transition at midcell for each "1," and at the beginning of the bit cell interval for each multiple "0," which results in a recorded MFM wave form 52 (FIG. 2*k*).

Figure 3:
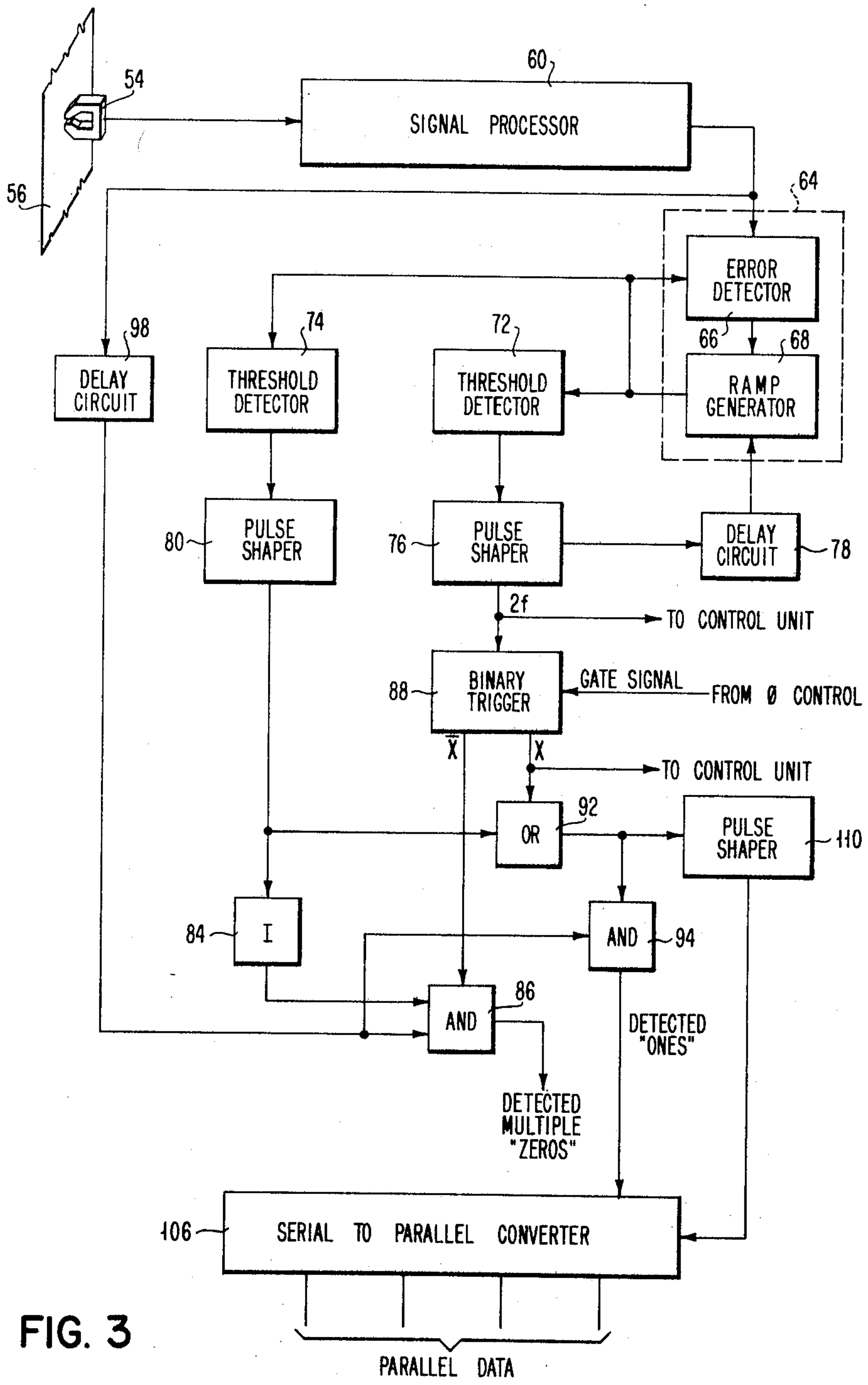
FIGURE 3 is a block diagram of the decoding and detection circuit, in accordance with this invention.

To detect and decode the data that was recorded on the magnetic medium, a magnetic transducer or head 54 senses the flux variations on the medium, such as a magnetic tape 56, that is transported at a controlled speed and tension relative to the head 54, as illustrated in FIG. 3. The sensed flux signal 58 (FIG. 4*a*) is transduced and processed by a signal processor 60, which may include an amplifier, filter, differentiator, limiter and shaper, to produce a pulse signal 62 (FIG. 4*b*) related to the positive and negative peaks of the playback signal 58.

The pulse signal 62, which corresponds to the detected raw data, is directed to a variable frequency oscillator 64, comprising an error detector 66 and ramp generator 68 coupled in a feedback loop. The ramp waveform 70 (FIG. 4*c*), developed by the generator 68, is at 2*f*, i.e., twice the highest frequency of the data being processed. If the data bit pulse 62 is centered relative to the half-period ramp 70, then a zero error is seen by the detector 66. However, if the data bit pulse 62 is not aligned relative to the ramp, then the detector 66 provides an error signal to adjust the frequency of the ramp generator 68. Thus, the readout signal 58 and the ramp signal are phase locked, and each data bit will fall substantially at the midpoint of the ramp waveform. If the data bits 62 appear before the midpoint of the ramp, the detector 66 acts to increase the frequency of generator 68; whereas, if the bits 62 fall after the ramp midpoint, the error signal serves to decrease the ramp generator frequency.

Coupled to the output of the ramp generator 68 are two circuit branches, including respectively two threshold detectors 72 and 74, each having positive and negative level detection means. The detector 72 senses the positive and negative peak values of the ramp waveform 70, which may be +3 and —3 volts, by way of example. The peak values and the slope of the ramp determine the period and frequency 2*f* of the ramp waveform. The detected peak voltages are fed to a pulse shaper 76, which provides an output to a delay circuit 78, coupled to the flyback circuit of the ramp generator 68. The pulse shaper 76 and delay circuit 78 serve to establish the retrace time for the ramp signal 70. Since two positive and two negative peaks of the ramp waveform 70 are detected for each data bit cell period T, a timing pulse of frequency 2*f* is obtained that may be utilized as a reference clock in an associated control unit for synchronization of the system.

Simultaneously, the detector 74 senses positive and negative voltage levels, say +2 and —2 volts, along the slope of the ramp 70, and activates a pulse shaper 80 to produce a bias gate pulse 82 (FIG. 4*d*), which is nonsymmetrical, having a greater negative portion than positive portion measured over any bit cell interval. In this particular case, the negative voltage portion occupies substantially 80% of the ramp period in contrast to 20% used for the positive voltage portion. This asymmetrical pulse signal 82 is processed by an inverter 84, and the inverted pulse is applied to a three-input AND gate 86.

Figure 4:
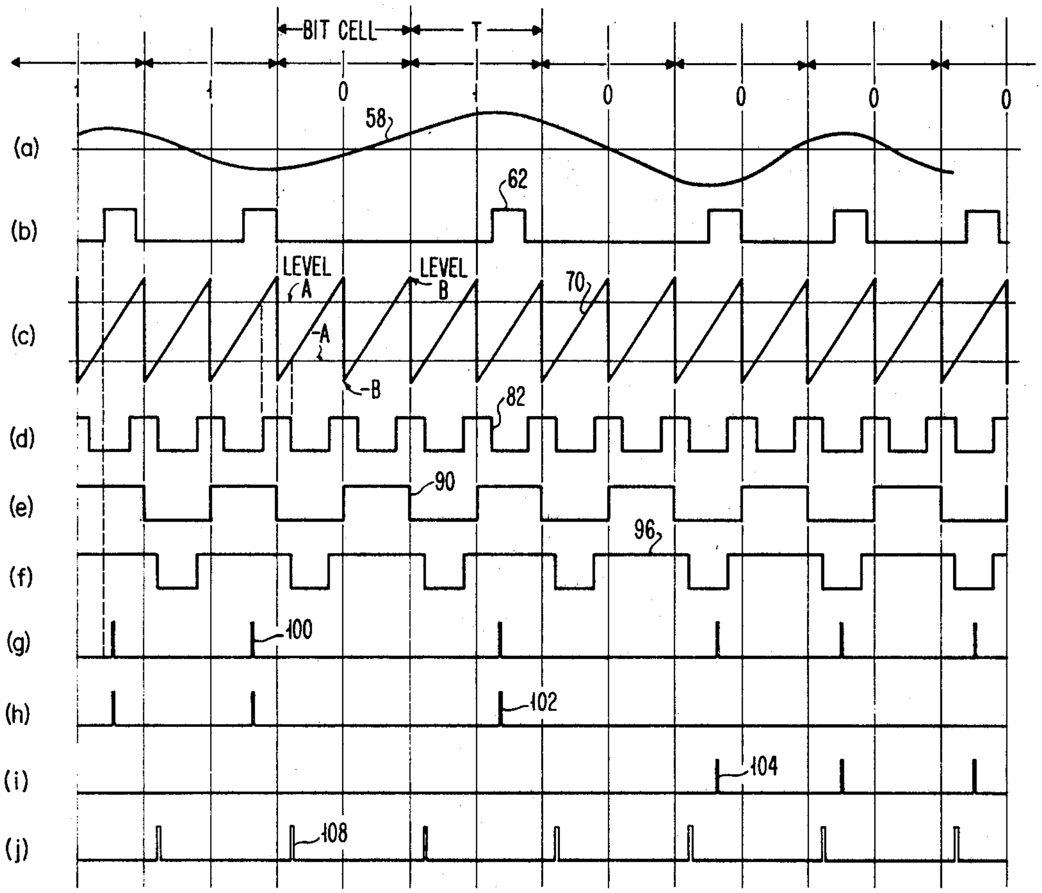
FIGURES 4*a–j* are a series of waveforms representing the signals developed in the operation of the circuit of FIG. 3.
Figure 5:
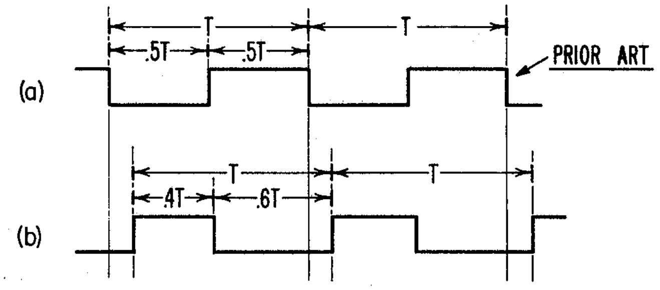
FIGURES 5*a–b* are timing diagrams depicting respectively the apportionment of a bit cell interval, as found in the prior art and according to the present invention.

In the channel that includes the threshold detector 72, the 2*f* pulse signal from the pulse shaper 76 is fed to a binary trigger 88 that produces a gate signal 90 (FIG. 4*e*) with outputs X and $\overline{X}$ having a frequency *f*, equal to the highest data rate. In order to maintain the proper phase of the data being detected, relative to the various units of the data processing system, a gate signal is obtained from a phase control unit (not shown) to lock the trigger circuit 88 to a reference. A one-half cycle clock pulse X (FIG. 4*e*) is directed to an OR gate 92; while a one-half cycle clock pulse corresponding to $\overline{X}$ appears at the input of the AND circuit 86. The OR gate 92 also receives the bias gate signal 82 from the pulse shaper 80, whereby the resultant output from the OR gate is an asymmetrical data gate signal 96 (FIG. 4*f*). This data gate signal 96 bears the approximate 60–40% apportionment of positive to negative voltage as determined by the threshold detector 74, acting in conjunction with the threshold detector 72 and ramp generator 68. It should be understood that the particular 60–40% relationship is an arbitrary ratio, and that the instant invention is not limited thereto. In any event, the window of the data gate signal 96 that passes the detected data bits or "1's," representing positive data or the presence of data, is enlarged, as represented in FIG. 5*b*. In this manner, the problem of bit shifting is alleviated, and storage density is improved, among other things.

In order to obtain the readout data from the processor 60 for further utilization, the detected raw data is passed through a suitable delay circuit 98 that produces narrow data pulses having a delay to compensate for that experienced by the gate pulses in the threshold detector circuit branches. The delayed data pulses 100 (FIG. 4*g*) are presented to the AND gates 86 and 94. During the positive voltage periods of the data gate signal 96, when the OR gate 92 is open, the positive data or binary "1" bits are directed to the enabled AND gate 94 and passed as a detected "1" or data signal 102 (FIG. 4*h*). On the other hand, during the negative voltage period of the data gate 96, detected multiple "0" data 104 (FIG. 4*i*) are passed through AND gate 86.

The detected "1" bits 102 are stepped serially into a serial-to-parallel converter 106 by a strobe pulse 108 that is obtained by means of a pulse shaper 110, responsive to the negative going edges of the data gate pulse 96. The recovered serial data bits are then converted, if so desired, to a parallel format, in a well-known manner, and directed to a data processor for further utilization. The detected multiple "0's" may be used in a coded form to identify address areas related to the data being processed.

In a successful embodiment of this invention, used in a magnetic recording and reproducing system, the following values were employed for a recorded wavelength of about 550 microinches, or data frequency *f* of 450 kilocycles per second: gap length of the magnetic head was 150 microinches, head-to-tape spacing was 75 microinches, and the thickness of the medium was 100 microinches.

The scope of the invention is not limited to the particular values or configuration set forth above. For example, the medium may be a magnetic disk or drum in lieu of a magnetic tape. The binary value representing the presence of data may be designated as "0" and the absence of data as "1," opposite to that used in the above description. Also, the ratio of the data signal need not be 60–40%, but may be some other apportionment to enhance processing of the detected data. Furthermore, other means to generate the asymmetrical gate may be utilized, such as a combination of different value resistances, and switching means to couple the resistances into the circuit alternately. Various modifications may be effected within the scope of this invention.

There has been described herein a data processing system utilizing a modified frequency modulation and a novel decoding technique for achieving maximum storage density. By apportioning a data gate signal so that a greater period is allotted to those bits exhibiting the largest amount of peak shift, a minimal number of flux changes or transitions need be used, thus realizing maximum storage density.

With the coding and decoding system disclosed herein, it is possible to narrow the operating frequency bandwidth to one octave. Moreover, when compared to conventional frequency or phase modulation, packing density and capacity of the storage system is virtually doubled without degradation in signal during storage and detection.

While the invention has been particularly shown and described with reference to a preferred embodiment thereof, it will be understood by those skilled in the art that the foregoing and other changes in form and details may be made therein without departing from the spirit and scope of the invention:

What is claimed is:

1. Apparatus wherein data bits are stored within bit cells at a base frequency, the data being manifested by flux transitions, the transition representing a first data bit value occurring substantially at the middle of the bit cell, and the transition representing a second bit value occurring substantially at the beginning of the bit cell, except when said second bit value immediately follows a first bit value, comprising:

means for recovering the stored bit data;

means for generating an asymmetrical data gate signal at twice such base frequency coupled to said data recovering means, the gate signal having a time portion of one voltage polarity that is greater than the time portion allotted to the other voltage polarity; and means for detecting the data bits of the first value during the greater time portion.

2. Apparatus as in claim 1, wherein said data gate signal generating means comprises;

means for generating a ramp signal having a slope portion and retrace portion;

first and second circuit branches coupled to said ramp generating means, the branches including first and second threshold detectors respectively, the first detector sensing voltages of different values of said ramp signal, the second detector sensing voltages of different values of said ramp signal other than the values sensed by said first detector; and means responsive to said sensed voltages for producing the asymmetrical data gate signal.

3. Apparatus as in claim 2, including means for comparing the phase of the generated ramp signal to that of the data bits; and means for adjusting the frequency of the ramp generating means to compensate for any phase difference between the ramp signal and the data signal.

4. Apparatus as in claim 3, including a delay circuit, coupled in a loop with said first threshold detector and said ramp generating means, for establishing the retrace time of the ramp signal.

5. Apparatus as in claim 2, wherein said first detector senses the positive and negative peak voltages of the ramp signal, and said second detector senses predetermined voltages spaced along the slope portion of the ramp for developing the data gate signal.

6. Apparatus as in claim 5, including a binary trigger circuit, coupled to said first detector, for providing gated timing pulses alternately to said first and second circuit branches.

7. Apparatus as in claim 2, further including a third circuit branch for channeling the recovered data to said detecting means, such third circuit branch including a matching delay circuit for applying the data signal to said data bit detecting means in synchronism with the data gate signal.

8. Apparatus as in claim 1, wherein the ratio of the time portions is substantially 60% to 40%.

9. Apparatus as in claim 8, wherein the data bits of the first value are binary "1's" that are detected during the 60% time portion, and the data bits of the second value are binary multiple "0's" that are detected during the 40% time portion.

References Cited

UNITED STATES PATENTS

| | | | |
|---|---|---|---|
| 3,108,261 | 10/1963 | Miller. | |
| 3,217,183 | 11/1965 | Thompson et al. | 340—174.1 X |
| 3,374,475 | 3/1968 | Gabor | 340—174.1 |
| 3,405,391 | 10/1968 | Halfhill et al. | 340—174.1 X |
| 3,414,894 | 12/1968 | Jacoby | 340—347 X |

MAYNARD R. WILBUR, Primary Examiner

MICHAEL K. WOLENSKY, Assistant Examiner

U.S. Cl. X.R.

340—172.5, 174.1